United States Patent [19]

Clarke et al.

[11] Patent Number: 4,680,132

[45] Date of Patent: Jul. 14, 1987

[54] PROCESSING DETERGENT BARS WITH A CAVITY TRANSFER MIXER TO REDUCE GRITTINESS

[75] Inventors: Terence A. Clarke; Richard B. Edwards; Graeme N. Irving, all of Wirral, England

[73] Assignee: Lever Brothers Company, New York, N.Y.

[21] Appl. No.: 703,457

[22] Filed: Feb. 21, 1985

Related U.S. Application Data

[63] Continuation of Ser. No. 587,874, Mar. 14, 1984, abandoned, which is a continuation of Ser. No. 479,625, Mar. 28, 1983, abandoned.

[30] Foreign Application Priority Data

Mar. 29, 1982 [GB] United Kingdom ................. 8209051

[51] Int. Cl.⁴ ........................... B01F 7/02; B29B 1/06; C11D 13/10; C11D 13/18

[52] U.S. Cl. .................................... 252/108; 252/134; 252/174; 252/370; 252/DIG. 16; 264/176 R; 264/310; 264/312; 264/176.1; 366/99; 366/279; 366/307; 425/200; 425/206; 425/207; 425/209

[58] Field of Search ............... 252/108, 134, 132, 174, 252/367, 368, 370, 371, DIG. 16; 264/176 R, 310, 312; 366/99, 279, 307; 425/200, 204, 207, 209

[56] References Cited

U.S. PATENT DOCUMENTS

| | | | |
|---|---|---|---|
| 2,048,286 | 7/1936 | Pease | 18/22 |
| 2,295,594 | 9/1942 | Mills . | |
| 2,525,081 | 10/1950 | Schulerud | 252/370 |
| 2,640,033 | 5/1953 | Marshall | 252/367 |
| 2,686,761 | 8/1954 | Ferguson et al. . | |
| 2,810,159 | 10/1957 | Teichmann . | |
| 2,813,302 | 11/1957 | Beck . | |
| 2,970,116 | 1/1961 | Kelly . | |
| 3,089,197 | 5/1963 | Chaffee | 425/207 |
| 3,174,185 | 3/1965 | Gerber | 366/99 |
| 3,523,909 | 8/1970 | Bradley | 252/270 |
| 3,779,521 | 12/1973 | Godines . | |
| 3,801,248 | 4/1974 | Fischer . | |
| 4,057,379 | 11/1970 | Sato . | |
| 4,253,771 | 3/1981 | Renk . | |
| 4,419,014 | 12/1983 | Gale | 366/99 |

FOREIGN PATENT DOCUMENTS

| | | |
|---|---|---|
| 36985 | 3/1981 | European Pat. Off. . |
| 48590 | 3/1982 | European Pat. Off. . |
| 834242 | 3/1952 | Fed. Rep. of Germany . |
| 2543 | 5/1956 | Fed. Rep. of Germany . |
| 1090183 | 10/1960 | Fed. Rep. of Germany . |
| 2151891 | 7/1973 | Fed. Rep. of Germany . |
| 1135463 | 4/1957 | France . |
| 16243 | 4/1974 | Japan . |
| 723361 | 2/1955 | United Kingdom . |
| 727646 | 4/1955 | United Kingdom . |
| 729833 | 5/1955 | United Kingdom . |
| 787764 | 12/1957 | United Kingdom . |
| 841743 | 7/1960 | United Kingdom . |
| 843849 | 8/1960 | United Kingdom . |
| 930339 | 7/1963 | United Kingdom . |
| 935200 | 8/1963 | United Kingdom . |
| 1281628 | 7/1972 | United Kingdom . |
| 1327511 | 8/1973 | United Kingdom . |
| 1447435 | 8/1976 | United Kingdom . |
| 1475216 | 6/1977 | United Kingdom . |
| 2034742 | 6/1980 | United Kingdom . |
| 8030586 | 4/1982 | United Kingdom . |
| 2106407 | 4/1983 | United Kingdom . |

OTHER PUBLICATIONS

Oakes, "Continuous Automatic Mixer", pp. 1-12, Feb. 1975.
Bulletin No. 110—2 pages (Oakes), Feb. 1975.
Bulletin No. 501—2 pages (Oakes), Feb. 1975.
Bulletin No. 510—2 pages (Oakes), Feb. 1975.
Letter from Unilever PLC dated 13 Feb. 1985.
Letter from RAPRA dated 21st Feb. 1985.
Elastomerics, Oct. 1981, p. 76/8.

(List continued on next page.)

*Primary Examiner*—Dennis L. Albrecht
*Attorney, Agent, or Firm*—James J. Farrell

[57] ABSTRACT

Grittiness in soap-containing formulations, one source of which is the reworking of previously processed soap, is reduced in an efficient manner by passing the formulation through a cavity transfer mixer.

6 Claims, 8 Drawing Figures

OTHER PUBLICATIONS

Press Release by "The International Technical Centre for Rubbers and Plastics", dated Jan. 6, 1982, an Addendum to such Press Release indicating the parties to whom such Press Release was dispatched upon a world-wide basis.

Plastics & Rubber Weekly, No. 919, Jan. 9, 1981, p. 1.

Applications of the Cavity Transfer Mixer to Rubber Extrusion, presentation at a meeting of the Rubber Div., Amer. Chemical Soc., Philadelphia, May 4–8, 1982 by R. S. Hindmarch & G. M. Gale.

Press Release by "The International Technical Centre for Rubbers and Plastics", dated Aug. 3, 1981, Addendum to such Press Release showing the persons to whom such Press Release was dispatched upon a world-wise basis.

Kirk–Othmer Encyclopedia of Chemical Technology, Second Edition, vol. 18, pp. 426–432.

Buerger et al. in Proc. N.A.S., 31 (1945), pp. 226–233.

Ferguson, R. H., "Oil & Soap", Jan. 1944, pp. 6 to 9.

Ferguson, R. H. et al., "Industrial and Engineering Chemistry", 35, No. 9 (1943), pp. 1005–1012.

Bailey's Industrial Oil & Fat Products, vol. 1, 4th Ed., John Wiley & Sons, pp. 523–526.

RAPRA CTM cavity transfer mixer advertising leaflet.

RAPRA News, vol. 5, No. 3, p. 5, Autumn 1981.

RAPRA News, vol. 6, No. 1, pp. 1 and 5, Spring 1982.

PROCESSING DETERGENT BARS WITH A CAVITY TRANSFER MIXER TO REDUCE GRITTINESS

This application is a continuation of Ser. No. 587,874, filed Mar. 14, 1984, now abandoned, which is a continuation of Ser. No. 479,625, filed Mar. 28, 1983, now abandoned.

FIELD OF THE INVENTION

This invention relates to the processing of soap feedstocks to provide a soap bar having reduced grittiness.

BACKGROUND TO THE INVENTION

Soap bars are required to have a smooth feel to provide comfortable in-use properties. However some ingredients in soap material can lead to grittiness during washing. A common feature of most soap processing lines is the use at the final plodder stage of scrap soap from the stamped bars. Soap from this source will have a lower water content than the soap feed material and will thus be harder. The presence of the scrap soap can lead to grittiness in the bar. Grittiness may also develop when a superfatting agent is added to soap after the final dryer stage.

The present invention utilises processing conditions to reduce grittiness by subjecting the soap feedstock to considerable working in an efficient manner.

GENERAL DESCRIPTION

Certain formulations leading to grittiness in the product bar when processed by standard methods will be less gritty when subjected to processing in accordance with this invention.

The present invention uses a device of the cavity transfer mixer class to work the soap base. These devices comprise two closely spaced mutually displaceable surfaces each having a pattern of cavities which overlap during movement of the surfaces so that the material moved between the surfaces traces a path through cavities alternately in each surface so that the bulk of the material passes through the shear zone in the material generated by displacement of the surfaces.

Cavity transfer mixers are normally prepared with a cylindrical geometry and in the preferred devices for this process the cavities are arranged to give constantly available but changing pathways through the device during mutual movement of the two surfaces. The devices having a cylindrical geometry can comprise a stator within which is journalled a rotor; the opposing faces of the stator and rotor carry the cavities through which the material passes during its passage through the device.

The device may also have a planar geometry in which opposed plane surfaces having patterns of cavities would be moved mutually, for example by rotation of one plane, so that material introduced between the surfaces at the point of rotation would move outwards and travel alternately between cavities on each surface.

Another form of cylindrical geometry maintains the inner cylinder stationary while rotating the outer cylinder. The central stator is more easily cooled, or heated if required, because the fluid connections can be made in a simple manner; the external rotor can also be cooled or heated in a relatively simple manner. It is also mechanically simpler to apply rotational energy to the external body rather than the internal cylinder. Thus this configuration has advantages in construction and use.

Material is forced through the mixer using auxiliary equipment as the rotor is turned. Examples of the auxiliary equipment are screw extruders and piston rams. The auxiliary equipment is preferably operated separately from the mixer so that the throughput and work performed on it can be separately varied. The separate operation may be achieved by arranging the auxiliary equipment to provide material for processing at an angle to the centre line of the shear-producing device. This arrangement allows rotational energy to be supplied to the device around its centre line. An in-line arrangement is more easily achieved when the external member of the device is the rotor. Separate operation of the device and auxiliary equipment assists in providing control of the processing.

In general a variety of cavity shapes can be used, for example Metal Box (UK No. 930 339) disclose longitudinal slots in the two surfaces. The stator and rotor may carry slots, for example six to twelve, spaced around their periphery and extending along their whole length.

Preferably one or both surfaces are subjected to thermal control. The process allows efficient heating/cooling of the material to be achieved. Preferably the temperature of the material during processing is below 40° C. The processing temperature will usually be from about 30° C. to about 55° C.

The soap feedstock may contain non-soap detergents in amounts which do not interfere with the desired effect. Examples of these actives are alkane sulphonates, alcohol sulphates, alkyl benzene sulphonates, alkyl sulphates, acyl isethionates, olefin sulphonates and ethoxylated alcohols.

The processed feedstock was made into bar form using standard stamping machinery. Other product forms, e.g. extruded particles (noodles) and beads can be prepared from the feedstock.

BRIEF DESCRIPTION OF THE DRAWINGS

The invention will be described with reference to the accompanying diagrammatic drawings in which.

SPECIFIC DESCRIPTION OF DEVICES

Embodiments of the devices will now be described.

Figure 1:
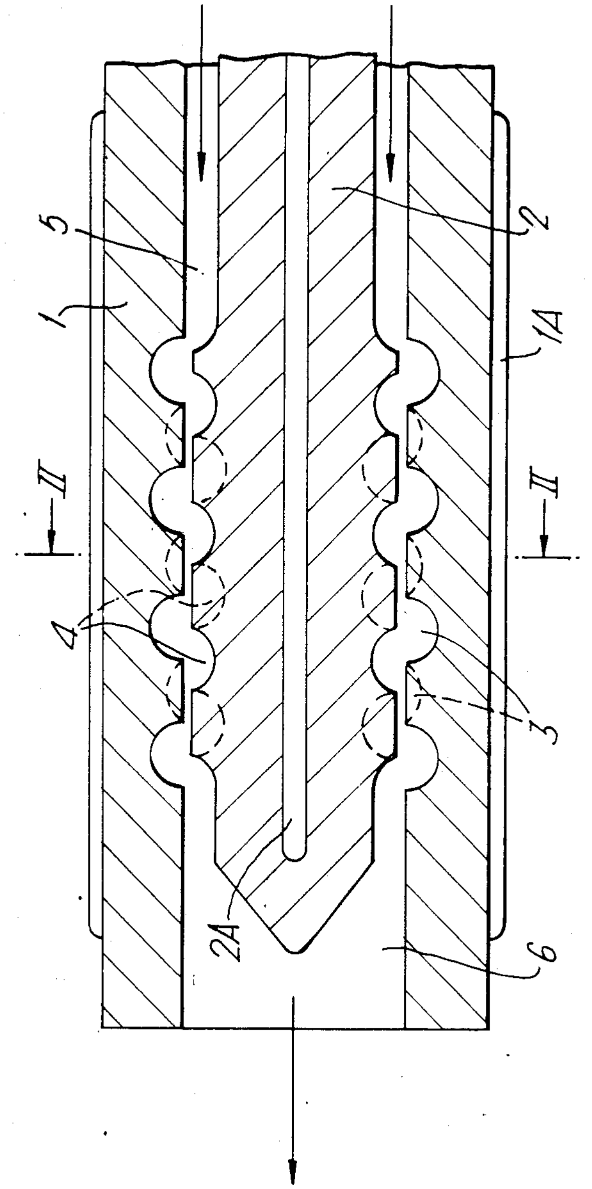
FIG. 1 is a longitudinal section of a cavity transfer mixer with cylindrical geometry.

A cavity transfer mixer is shown in FIG. 1 in longitudinal section. This comprises a hollow cylindrical stator member 1, a cylindrical rotor member 2 journalled for rotation within the stator with a sliding fit, the facing cylindrical surfaces of the rotor and stator carrying respective pluralities of parallel, circumferentially extending rows of cavities which are disposed with:

(a) the cavities in adjacent rows on the stator circumferentially offset;

(b) the cavities in adjacent rows on the rotor circumferentially offset; and (c) the rows of cavities on the stator and rotor axially offset.

Figure 2:
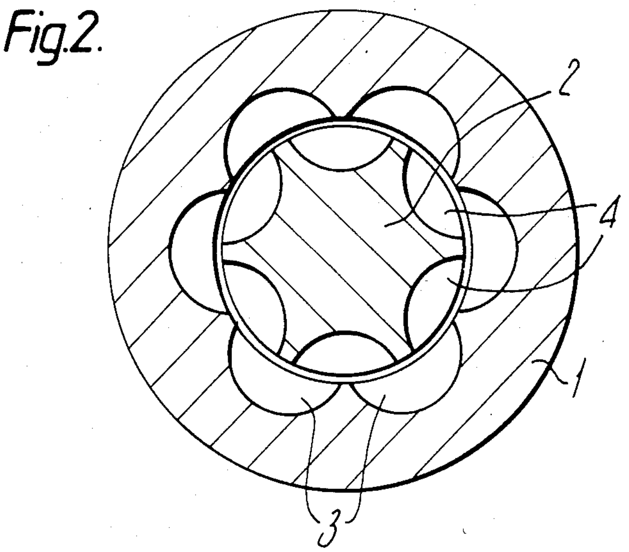
FIG. 2 is a transverse section along the line II—II on FIG. 1.
Figure 3:
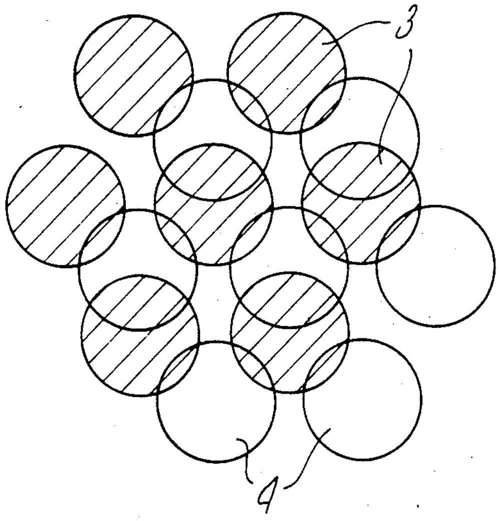
FIG. 3 illustrates the pattern of cavities in the device of FIG. 1.

The pattern of cavities carried on the stator 3 and rotor 4 are illustrated on FIG. 3. The cavities 3 on the stator are shown hatched. The overlap between patterns of cavities 3, 4 is also shown in FIG. 2. A liquid jacket 1A is provided for the application of temperature control by the passage of heating or cooling water. A temperature control conduit 2A is provided in the rotor.

The material passing through the device moves through the cavities alternately on the opposing faces of the stator and rotor. The cavities immediately behind those shown in section are indicated by dotted profiles on FIG. 1 to allow the repeating pattern to be seen.

The material flow is divided between pairs of adjacent cavities on the same rotor or stator face because of the overlapping position of the cavities on the opposite stator or rotor face.

The whole or bulk of the material flow is subjected to considerable working during its passage through the shear zone generated by the mutual displacement of the stator and rotor surfaces. The material is entrained for a short period in each cavity during passage and thus one of its velocity components is altered.

The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit. The material to be worked was injected into the device through channel 5, which communicates with the annular space between the rotor and stator, during operation by a screw extruder. The material left the device through nozzle 6.

Figure 4:
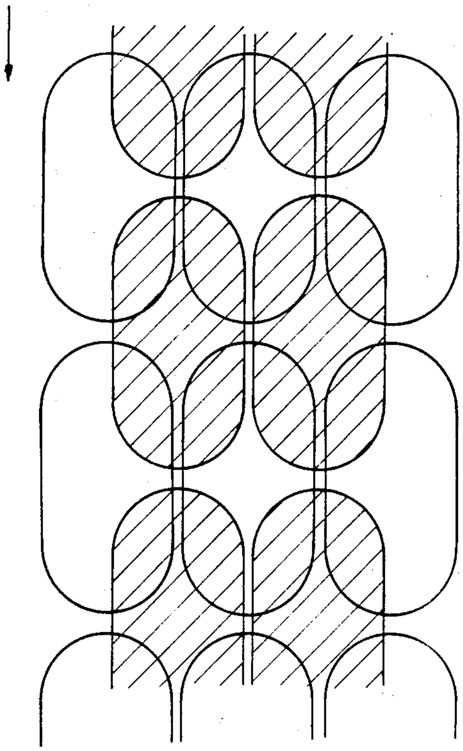
FIGS. 4, 5 and 7 illustrate other patterns of cavities.

FIG. 4 shows elongate cavities arranged in a square pattern; these cavities have the sectional profile of FIG. 2. These cavities are aligned with their longitudinal axis parallel to the longitudinal axis of the device and the direction of movement of material through the device; the latter is indicated by the arrow.

Figure 5:
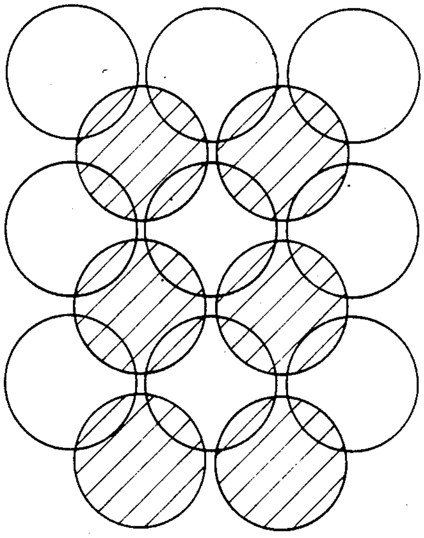

FIG. 5 shows a pattern of cavities having the dimensions and profile of those shown in FIGS. 1, 2 and 3. The cavities of FIG. 5 are arranged in a square pattern with each cavity being closely spaced from four adjacent cavities on the same surface. This pattern does not provide as high a degree of overlap as given by the pattern of FIG. 3. The latter has each cavity closely spaced to six cavities on the same surface, i.e. a hexagonal pattern.

Figure 6:
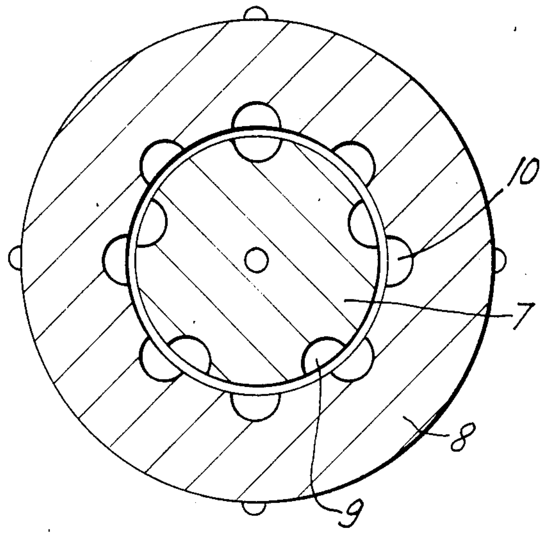
FIG. 6 is a transverse section through a mixer having grooves in the opposed surfaces of the device.

FIG. 6 is a section of a cavity transfer mixer having a rotor 7 rotatably positioned within the hollow stator 8 having an effective length of 10.7 cm and a diameter of 2.54 cm. The rotor carried five parallel grooves 9 of semi-circular cross section (diameter 5 mm) equally spaced around the periphery and extending parallel to the longitudinal axis along the length of the rotor. The inner cylindrical surface of the stator 8 carried eight grooves 10 of similar dimensions extending along its length and parallel to the longitudinal axis. This embodiment, utilised cavities extending along the length of the stator and rotor without interruption. Temperature control jacket and conduit were present.

Figure 7:
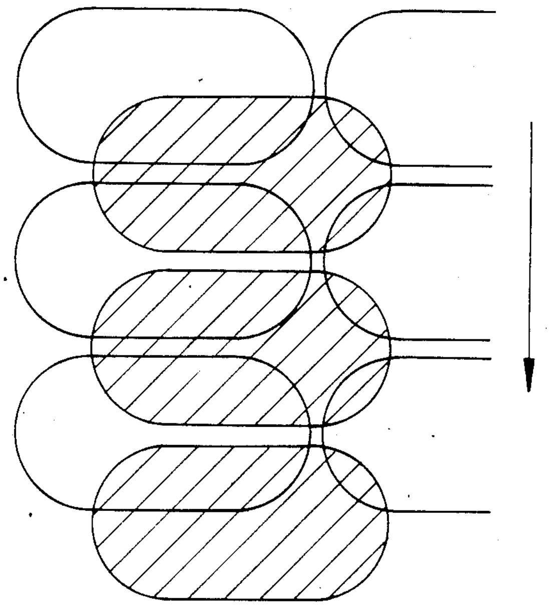

FIG. 7 shows a pattern of cavities wherein the cavities on the rotor, shown hatched, and stator have a larger dimension normal to the material flow; the latter is indicated by an arrow. The cavities are thus elongate. This embodiment provides a lower pressure drop over its length compared with devices of similar geometry but not having cavities positioned with a longer dimension normal, i.e. perpendicular to the material flow. To obtain a reduction in pressure drop at least one of the surfaces must carry elongate cavities having their longer dimension normal to the material flow.

Figure 8:
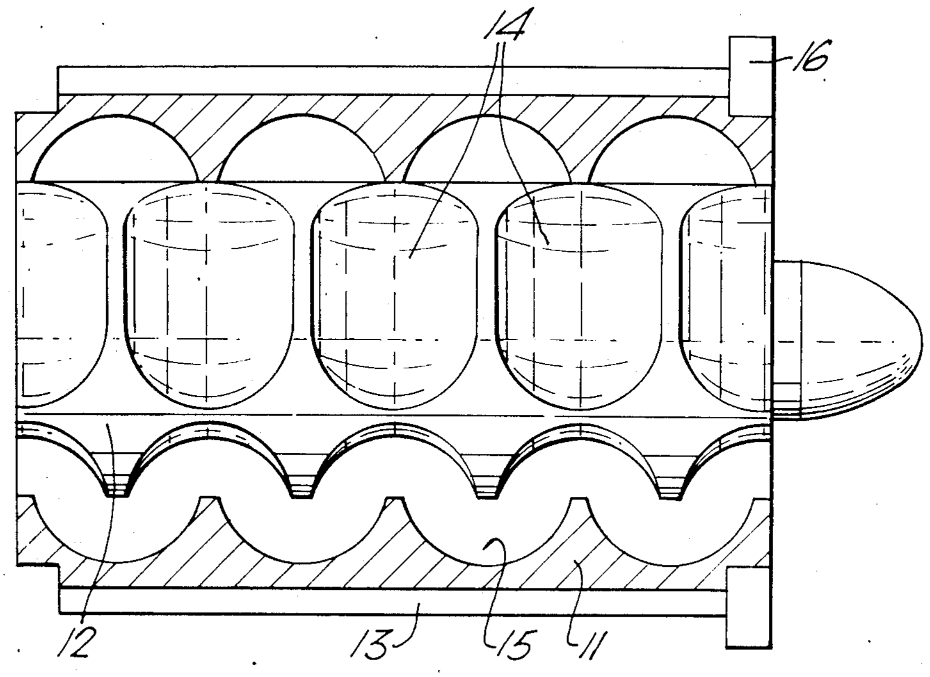
FIG. 8 is a longitudinal section of a cavity transfer mixer in which the external cylinder forms the rotor.

The cavity transfer mixer of FIG. 8 had the external cylinder 11 journalled for rotation about central shaft 12. Temperature control jacket 13 and conduit were present but the latter is not shown because the cavities on the central shaft are shown in plan view while the rotor is sectioned. The central stator (diameter 52 mm) had three rows 14 of three cavities with partial, i.e. half cavities at the entry and exit points. On the rotor there were four rows 15 of three cavities. The cavities on the stator and rotor were elongate with a total arc dimension of 5.1 cm normal to the material flow with hemispherical section ends of 1.2 cm radius joined by a semicircular sectioned panel of the same radius. The cavities were arranged in the pattern of FIG. 7, i.e. with their long dimension normal to material flow. The rotor was driven by a chain drive to external toothed wheel 16.

EXAMPLE

The cavity transfer mixer illustrated in FIG. 1 was used.

The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit.

A tallow/coconut blend (80/20) was vacuum dried to 12% moisture. A portion was air dried at 70° C. to a moisture content of 5%. A mixture of 2 parts of the 12% moisture material and 1 part of the 5% moisture material was prepared and divided. One half was subjected to treatment in the cavity transfer device with the aid of a soap plodder while the other half was processed by the conventional milling route. The cavity transfer mixer was operated at 50 rpm with a throughput of 156 g $min^{-1}$ and water cooling was applied to the stator and rotor.

Tablets were stamped from each of the treated feedstocks and, used in handwashing at ambient. The tablets subjected to conventional treatment were gritty to the feel while those treated according to the invention were not classified as gritty by the users.

What we claim is:

1. A process of reducing the grittiness in a soap-containing feedstock wherein the feedstock is subjected to working by passing said feedstock between two closely spaced mutually displaceable surfaces each having a pattern of cavities which overlap during movement of the surfaces so that the material moved between the surfaces traces a path through cavities alternately in each surface, whereby the bulk of the material passes through the shear zone generated in the material by displacement of the surfaces.

2. A process according to claim 1 wherein the two surfaces have cylindrical geometry.

3. A process according to claim 1 or 2 wherein thermal control is applied to at least one surface.

4. A process according to claim 1 or 2 wherein the cavities in at least one surface are elongate with their long dimension normal to the flow of material.

5. A process according to claim 1 or 2 wherein the temperature of the soap-containing formulation during processing is in the range from about 30° C. to about 55° C.

6. A process according to claim 5 wherein the temperature is below about 40° C.

* * * * *